W. G. DETWILER & J. E. FIREBAUGH.
STRAW AND MANURE SPREADER.
APPLICATION FILED MAY 15, 1909.
934,146.
Patented Sept. 14, 1909.
5 SHEETS—SHEET 3.
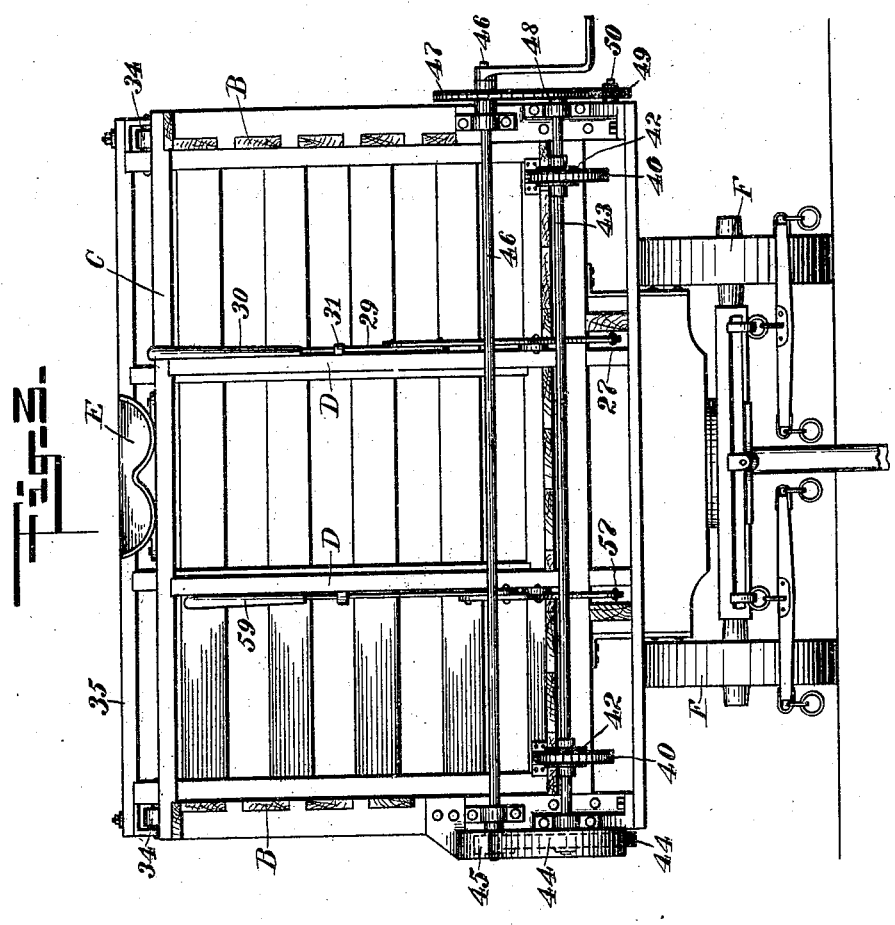
WITNESSES
INVENTORS
William G. Detwiler
James E. Firebaugh
BY
ATTORNEYS

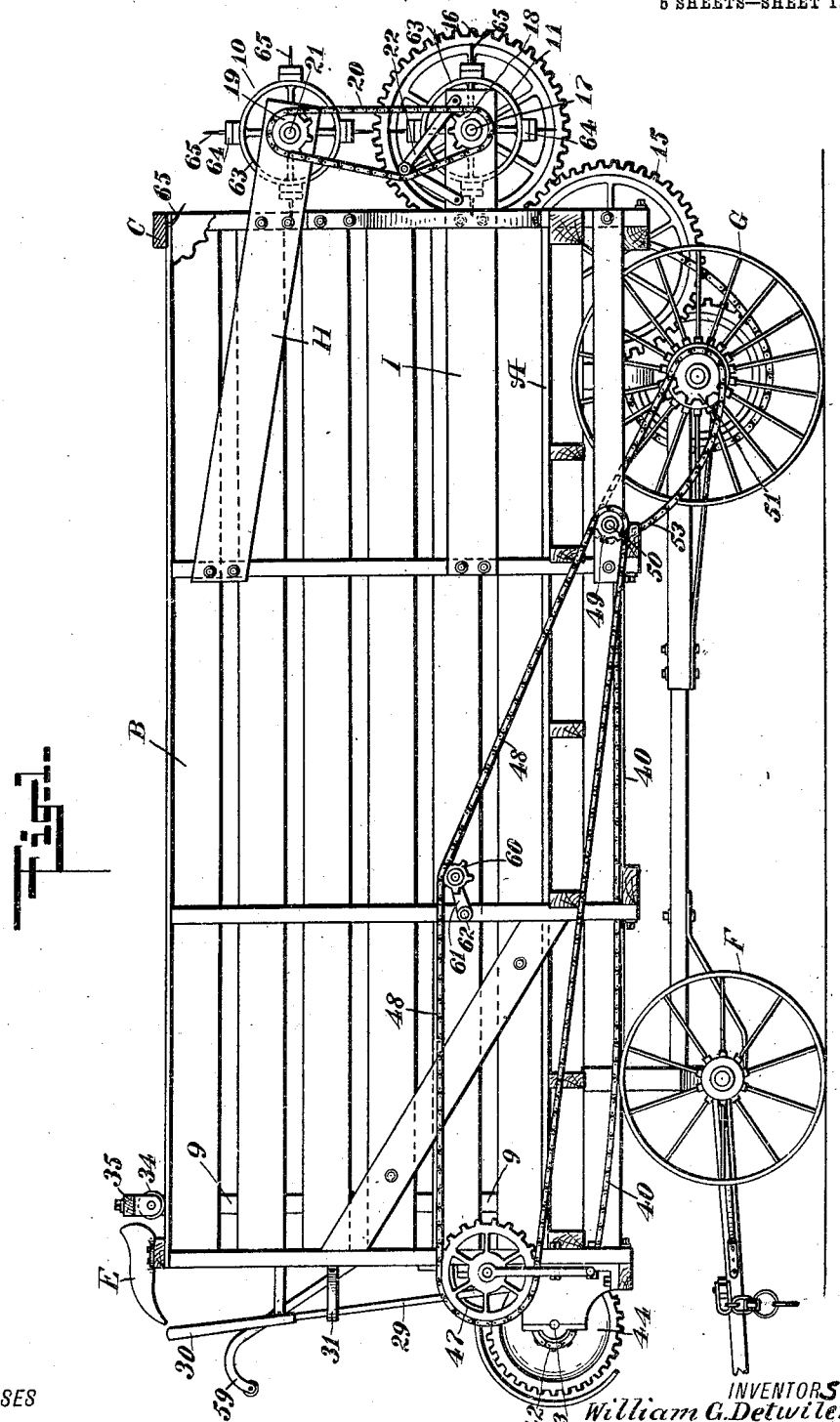

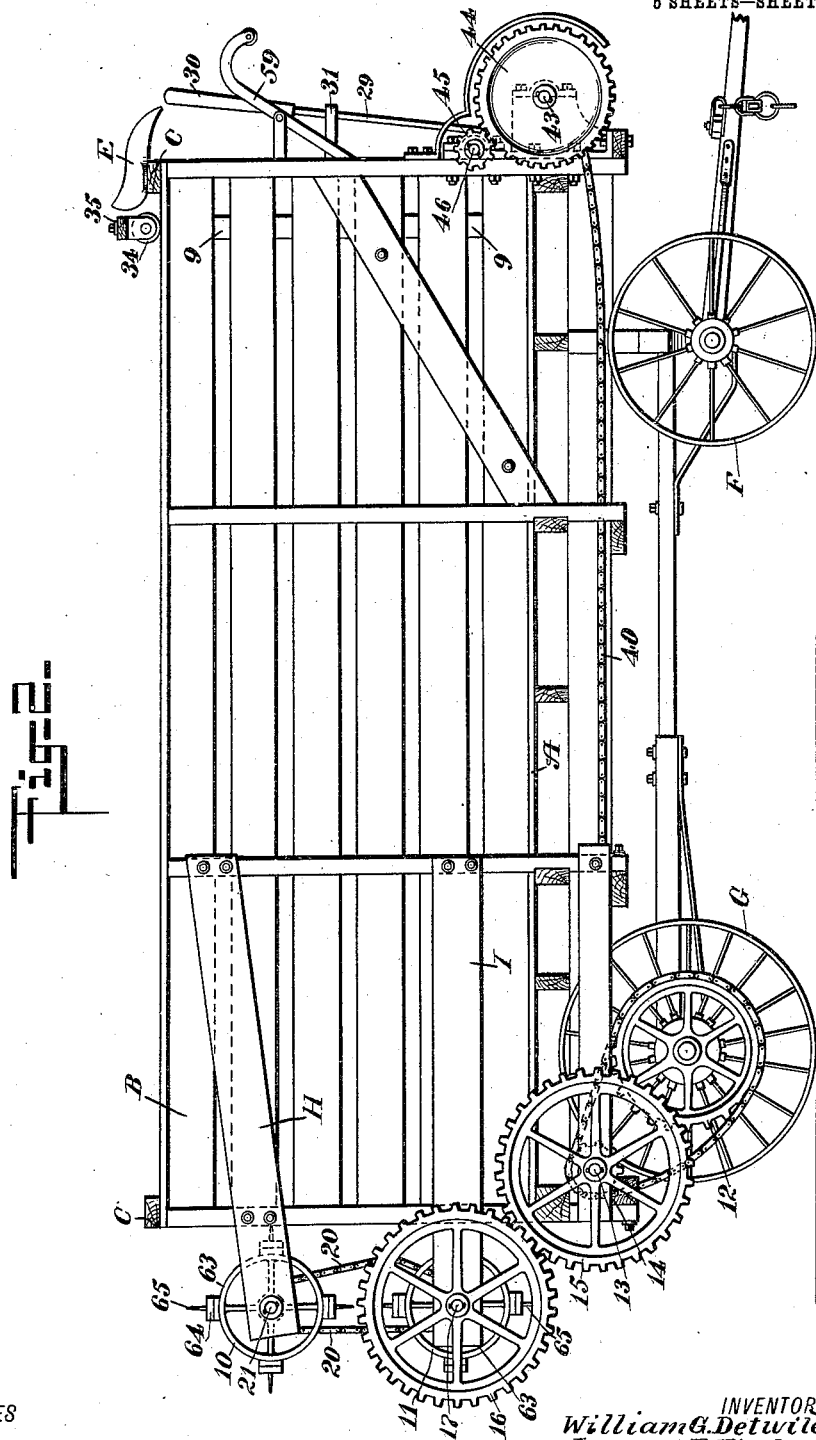

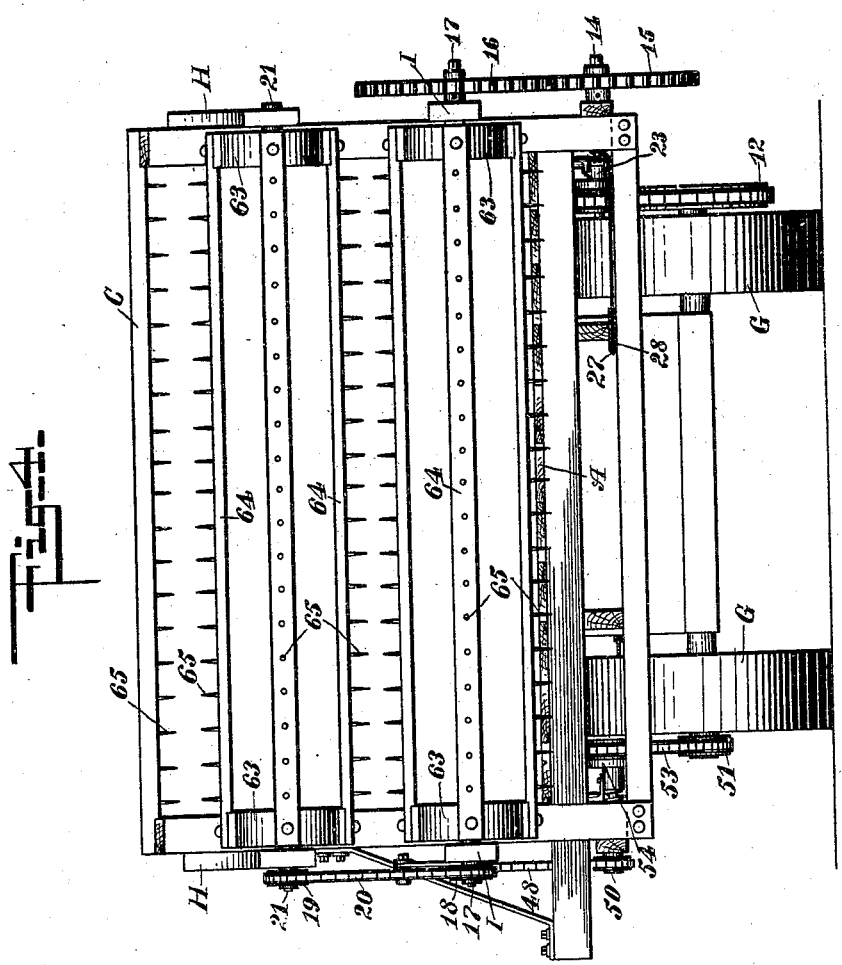

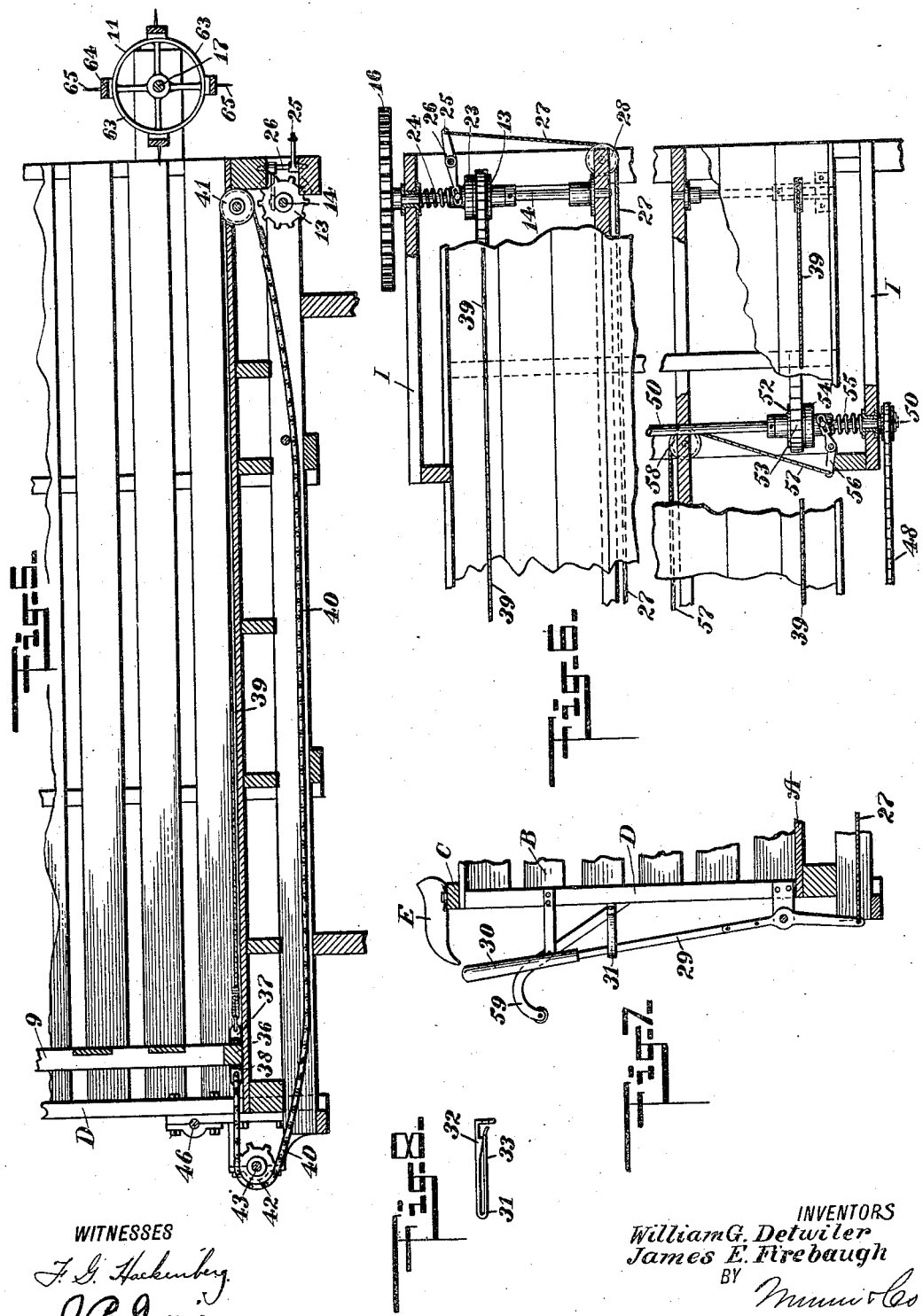

UNITED STATES PATENT OFFICE.

WILLIAM G. DETWILER AND JAMES E. FIREBAUGH, OF ST. JOHN, KANSAS.

STRAW AND MANURE SPREADER.

934,146.  Specification of Letters Patent.   Patented Sept. 14, 1909.

Application filed May 15, 1909. Serial No. 496,107.

*To all whom it may concern:*

Be it known that we, WILLIAM G. DETWILER and JAMES E. FIREBAUGH, citizens of the United States, and residents of St. John, in the county of Stafford and State of Kansas, have invented a new and useful Improvement in Straw and Manure Spreaders, of which the following is a full, clear, and exact description.

The principal objects which the present invention has in view are: to provide a mechanism for distributing the materials being handled, by power applied through the carrying wheels of the vehicle; to provide means for feeding the material being handled, to the distributing members; and to provide an operating construction which is at once simple, durable and free in operation.

One embodiment of the invention is disclosed in the construction illustrated in the accompanying drawings, wherein like characters of reference indicate corresponding parts in all the views.

Figure 1 is a side elevation of a vehicle constructed and arranged in accordance with our invention; Fig. 2 is a side elevation of the vehicle shown in Fig. 1, this view being taken from the side opposite that shown in Fig. 1; Fig. 3 is a front end elevation of the vehicle; Fig. 4 is a rear end elevation of the same; Fig. 5 is a longitudinal section taken through the body portion of the vehicle, the running gear and upper section of the body being removed; Fig. 6 is a plan view partly in section, being contracted and broken away to expose the operating mechanism for the distributers mounted on said vehicle; Fig. 7 is an enlarged detail view showing the mounting of the controlling levers, whereby the distributing mechanism is thrown in and out of operation; and Fig. 8 is a top view in detail of the spring detent for holding the lever for controlling the distributing mechanism in operative position.

The present invention may be divided into one group of elements formed by the vehicle body and running gear, and a second group formed by the power-transmitting and controlling devices. For the purpose of quickly distinguishing the one group from the other, we have employed the indicating characters as follows: to wit, the group of elements comprising the body and running gear construction we indicate by letters of the alphabet, while the power-transmitting and controlling devices we have indicated by numerals. Thus the body of the vehicle is composed of a bottom A, side racks B, B, and cross rails C, and is further provided with stanchions D, D, which support the rails C upon which the driver's seat E is mounted. The rear end of the vehicle is not intended to be closed during the operation of the spreading device. The front end of the vehicle is closed by a movable rack 9, which is moved to the extreme front end when the load is placed in the body of the vehicle.

The structural features of the body are similar to those employed in the majority of so-called farm wagons, the carrying wheels F and G being of the usual broad-tired type, and the vehicle is adapted to be drawn by a team. From the side of the vehicle are extended framing beams H and I, upon the outer ends of which are mounted the rotary distributing drums 10 and 11.

The straw or manure being distributed is placed within the body of the vehicle, the rack 9 having been drawn to the front end of the vehicle prior to loading. In the operation of distribution, the rack 9 is drawn gradually toward the rear end of the vehicle, carrying the loaded material gradually to the rear end against the extended fingers or tines of the rotary drums 10 and 11. These drums when rotated at a high rate of speed, extract the material from the load and throw it into the air, causing a wide spread and even distribution of the same over the land upon which the vehicle is being moved.

The operating mechanism whereby the rack 9 is drawn toward the rear of the wagon, and whereby the rotary drums are rotated, is primarily actuated by sprocket wheels fixedly attached to the carrying wheels. A sprocket wheel 12 on the one wheel G is connected by a sprocket chain to a small sprocket wheel 13 mounted on a shaft 14, which is set in suitable bearings in the frame of the vehicle. The sprocket wheel 13 is small in diameter as compared with the sprocket 12, thereby increasing the rotary speed of the sprocket wheel 13 and the shaft 14 upon which the said sprocket wheel is mounted. Upon the shaft 14 is fixedly mounted a large sprocket wheel 15 which is in toothed engagement with a sprocket wheel 16; the relation of the sprocket wheels 15 and 16 may be equal or varied, as desired. According as the diameters are increased or decreased relatively, the speed of the shaft 17 on which the said wheel 16 is fixedly mounted is increased or decreased.

At the end of the shaft 17 on the opposite side of the vehicle from the sprocket wheel 16, there is provided a small sprocket wheel 18, which is in rotary engagement with a sprocket wheel 19 of the same diameter, the engagement being made by means of a sprocket chain 20. It is the intention to rotate the drums 10 and 11, which are fixedly mounted on the shafts 17 and 21 at the same rotary speed. This action is not essential, however, as the rotation of the two drums may be varied to suit the conditions or work and the desire of the operator. The sprocket chain 20 is maintained in a taut position by an arm 22 which carries a suitable idler pulley, the office of which is to maintain the chain in its tightened position. The arm 22 may be held in position to tighten the chain 20 by means of any suitable and well-known spring tension device.

Through the power transmission members thus far described, it will be seen that as the wheel G is rotated, the drums 10 and 11 are simultaneously rotated, but at a high rate of speed. It not being desired, however, that the distributing drums should be rotated as the vehicle is being shifted in its position (as when passing to and from the field), the sprocket wheel 13 is loosely mounted on the shaft 14 and is held in operative position thereon, only when a spring-actuated clutch 23 is permitted to be moved forward by a spring 24 against the sprocket wheel 13 or a clutch member connected therewith. The clutch 23 is mounted on the usual spline or feather seated in the shaft 14. The clutch 23 is held out of engagement by a lever 25 which is pivotally mounted on the frame at 26 and is suitably engaged with the clutch 23 to reciprocate the same on the shaft 14. The free end of the lever 25 is attached to a cable 27, which is guided by a sheave 28 to the forward end of the vehicle, where it is attached to the short end of a lever 29, the handle 30 of which is convenient to the driver's grasp when seated on the seat E. When the handle of the lever 29 is drawn back to remove the clutch 23 from engagement with the sprocket wheel 13, the said lever is held in a detent 31 behind a shoulder 32, where it is maintained by a leaf 33. It is in this position that the vehicle is drawn from point to point, without operating the distributing mechanism, the sprocket wheel 13 running loosely on the shaft 14. As the drums 10 and 11 are rotated, the material which has been loaded into the vehicle body is forced gradually to the rear end of the same by the rack 9, which is impelled to move toward the rear end of the vehicle. The rack 9 is suspended by means of rollers 34 which are mounted on the top rail 35 of the said rack, the rollers 34 holding the bottom of the rack out of frictional engagement with the bottom of the vehicle. On each side and at each end of the bottom rail 36 of the rack, there are provided ears 37 and 38 extended from opposite sides of the rail 36. To each of the said ears are connected cables 39 and sprocket chains 40, respectively. The cables 39 are guided at the rear end of the vehicle by sheaves 41 over which they are drawn by a sprocket wheel 42 mounted on a shaft 43 at the front end of the vehicle. The sprocket chains 40 are attached to the cables 39 and are in toothed engagement with the sprocket wheels 42. As the shaft 43 and sprocket wheels 42 are rotated, the rack 9 is drawn toward the front or rear end of the vehicle, as may be seen more particularly in Fig. 5 of the drawings. As a rule the rack is drawn to the front of the wagon by turning the shaft 43 by a hand crank provided for that purpose.

The shaft 43 is provided at its outer end with a large sprocket wheel 44, to which it is fixedly mounted. The sprocket wheel 44 is in toothed engagement with a pinion 45 mounted on a shaft 46, at the opposite end of which is fixedly mounted a sprocket wheel 47. The sprocket wheel 47 is connected by means of a sprocket chain 48, to a small sprocket wheel 49 which is fixedly mounted upon a shaft 50 mounted transversely of the body of the vehicle, and near the rear carrying wheels G. One of the carrying wheels G is provided with a sprocket wheel 51 which is connected with a sprocket wheel 52 loosely mounted on the shaft 50 by means of a sprocket chain 53. The sprocket wheel 52 is engaged by a spring-actuated clutch 54 which is mounted on the shaft 50 in reciprocating slidable relation thereto. The clutch 54 is normally held in engagement with the sprocket wheel 53 by a spring 55, and is disengaged from the sprocket wheel 53 against the compression of the spring 55, by a lever 56. The lever 56 is pivotally mounted on the frame of the vehicle and is attached at its free end to a cable 57, which is guided on a sheave 58 and extended forward to be connected to the lower end of a lever 59 mounted on the front of the vehicle, within reach of the grasp of the driver when seated on the seat E. When the lever 59 is drawn toward the driver, it may be held in such position by any form of detent such as that shown at 31 in the drawings. When thus drawn, the lever 59 holds the clutch 54 out of engagement, and the vehicle may be moved without in anywise affecting the position of the rack 9.

The sprocket chain 48 is guidably supported by a small sprocket idler 60, which is rotatably mounted on the end of a swinging lever 61, pivotally mounted at 62 by means of a clamping bolt; by this arrangement any slack in the chain 48 is taken up.

With a device constructed as thus described, the operation is as follows: While moving to the field the levers 29 and 59 have been drawn into position to disengage the clutches 23 and 54, permitting the shafts 14 and 50 to be rotated freely by the carrying wheels G. Having arrived at the field, the lever 30 is released, allowing the spring 24 to force the clutch 23 to engage the sprocket wheel 13, and through it to rotate the shaft 14 and the transmission gears 15, 16, 18, 19 and the shafts 17 and 21, carrying the rotary drums 10 and 11. At the same time the lever 59 is released, permitting the spring 55 to move the clutch 54 into engagement with the sprocket wheel 53, compelling the same to rotate with the shaft 50. The shaft 50 being thus rotated through the chain 48, the transmission gear 47 and the shaft 46, pinion 45, gear wheel 44 and shaft 43, are rotated, compelling the sprocket wheel 42 to rotate and thus move the chain 40 and the cable 39 to move the rack 9 toward the rear end of the vehicle, and force the material being handled against the rotary drums 10 and 11. This action continues until the entire load has been moved out of the vehicle, and the rack 9 is brought in close proximity to the rotary drums 10 and 11, when the whole load having been distributed, the distributing mechanisms are drawn out of engagement by means of the levers 29 and 59, and the vehicle is moved to the depot to be reloaded for a repetition of the operation just described.

The drums 10 and 11, which are mounted upon the shafts 21 and 17 respectively, consist of end rings 63, 63, which are connected by means of rails 64, provided with tine-like teeth 65, which when brought into alinement on both drums, approximate as shown in Fig. 4 of the drawings. The rail C at the rear end of the vehicle is likewise provided with a similar row of tines 65, the purpose of which is to shred the material being handled, before it is thrown by the rotary action of the drums, into the air.

Having thus described our invention, we claim as new and desire to secure by Letters Patent:

1. A straw and manure spreader, comprising a vehicle having elevated side racks and mounted on carrying wheels, a movable end rack mounted on said vehicle to extend across the same and to move from the front to the rear thereof said movable rack being suspended upon said side racks and mounted on rollers tracking on the top of the said side racks, a distributing mechanism embodying a plurality of rotary drums having tine-like extensions adapted to separate the material being handled and to toss the same into the air and away from the vehicle said drums being rotatively mounted in bearings upon the said side racks, an operating mechanism embodying the carrying wheels of said vehicle and adapted to rotate the said drums and to advance the said movable rack toward the said distributing mechanism, a flexible connection between the said movable rack and said operating mechanism said connection being attached to the said movable rack near the lower end thereof, a manually operated mechanism to retract the said movable rack for rotating the vehicle, and a disengaging device for disengaging the said operating mechanism and flexible connection.

2. A straw and manure spreader, comprising a vehicle having elevated side racks, a movable end rack adapted to extend across the body of the vehicle and having traction rolls at the end thereof whereby the said end rack is suspended on the said side racks, a distributing mechanism embodying a plurality of rotary drums having tine-like extensions adapted to separate the material being handled said drums being mounted upon the said side racks and across the rear end thereof and below the upper edge thereof, a cross brace extended between the said side racks and at the rear end thereof and above the upper of the said rotary drums said cross brace being provided with a row of tine-like members adapted to shred the material being handled as the same is passed over the uppermost of the said drums said cross member forming a stop for the rollers on which the said end rack is mounted, an operating mechanism embodying the carrying wheels of said vehicle and adapted to rotate said drums and to advance the said end rack against the said distributing mechanism, and a mechanism to retract the said end rack to the forward end of said vehicle independent of the operation of the said distributing mechanism.

In testimony whereof we have signed our names to this specification in the presence of two subscribing witnesses.

WILLIAM G. DETWILER.
JAMES E. FIREBAUGH.

Witnesses:
  F. B. GILLMORE,
  J. D. STEWART.